Dec. 30, 1941.     G. N. VAN SWERINGEN     2,267,851
BRAKE GEAR SAFETY SUPPORT
Filed May 8, 1940         3 Sheets-Sheet 1

INVENTOR
GEORGE N. VAN SWERINGEN
BY
Rodney Bedell
ATTORNEY

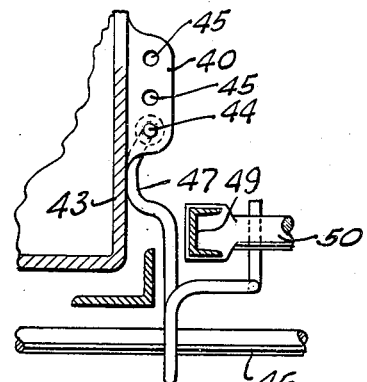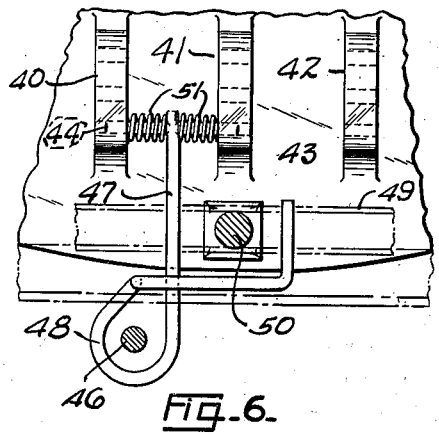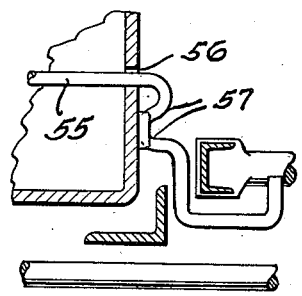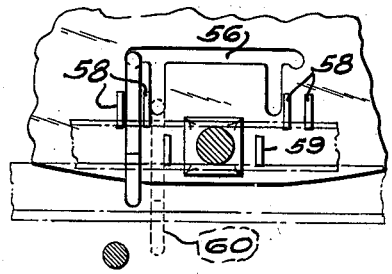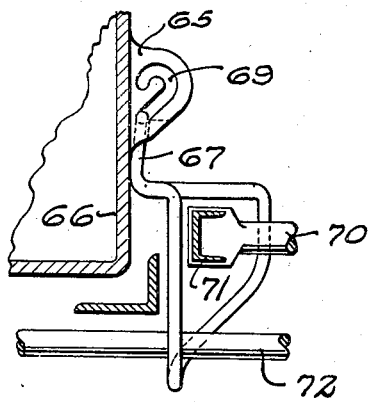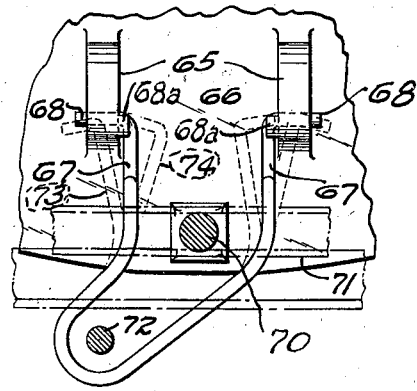

Dec. 30, 1941.     G. N. VAN SWERINGEN     2,267,851
BRAKE GEAR SAFETY SUPPORT
Filed May 8, 1940     3 Sheets-Sheet 3

INVENTOR:
GEORGE N. VAN SWERINGEN
BY Rodney Bedell
ATTORNEY

Patented Dec. 30, 1941

2,267,851

UNITED STATES PATENT OFFICE 2,267,851

BRAKE GEAR SAFETY SUPPORT

George N. Van Sweringen, Evanston, Ill., assignor to Chicago Railway Equipment Company, Chicago, Ill., a corporation of Illinois Application May 8, 1940, Serial No. 333,931

19 Claims. (Cl. 188—210)

The invention relates to railway rolling stock truck structure and more particularly to devices for safeguarding the brake gear against dropping to the track in the event of failure of the brake hangers or other supports normally carrying the brake gear.

The main object of the invention is to provide a simple, effective, economical safety device which can be applied readily to an ordinary brake part with minimum work on the latter.

Another object is to facilitate mounting the safety device at different heights to accommodate different relative vertical positions of the brake gear and the truck part carrying the safety device.

Another object is to mount the safety device without using separable attaching elements so that the safety device is not likely to be lost, and an incidental object is to mount the safety device so that it can be removed and replaced readily if it is desired to dismount the brake gear for which it is provided.

In the accompanying drawings illustrating the invention—

Figures 5, 7, 9, 11, 13 and 15 are detail sections corresponding to Figure 3 but each illustrating a different form of the invention.

Figure 4:
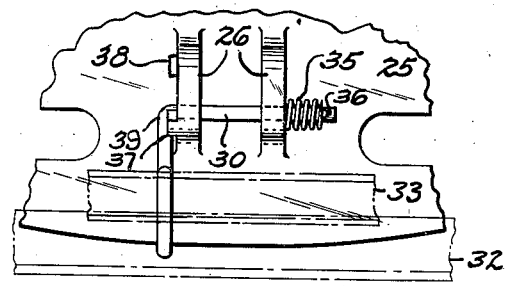
Figure 4 is a front view of the structure shown in Figure 3.

Figures 6, 8, 10, 12, 14 and 16 correspond generally to Figure 4 but illustrate the structures of Figures 5, 7, 9, 11, 13 and 15 respectively.

Figure 1:
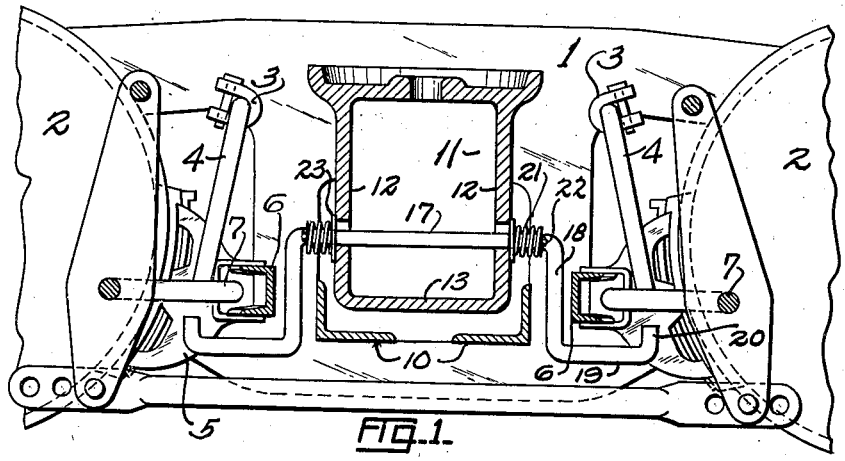
Figure 1 is a vertical longitudinal section through the middle portion of a four-wheel truck embodying one form of the invention.

In Figure 1 there is indicated a truck side frame 1 supported on wheels 2 in the usual manner and provided with brackets 3 receiving the upper ends of the brake hangers 4 by which the brake heads 5 are pivotally suspended. The heads are shown as mounted upon the ends of truss type brake beams, each comprising a compression member 6 and a tension rod 7 which will be anchored to the brake head and, at the middle of the beam, spaced by the usual strut (not shown). Angular spring plank elements 10 extend between and are mounted upon side frames 1 and serve as seats for bolster springs (not shown) which will carry the bolster 11 which supports the truck load and, through action of the bolster springs, will move vertically relative to the truck frame.

The bolster is shown as of box section having spaced upright webs forming side walls 12 and a bottom wall 13. Each side wall 12 is provided with an elongated horizontal slot 14 having a depression 15 at each end and relatively short vertical slots 16 extend downwardly from slot 14 adjacent to its depressions 15.

The safety device comprises a rod 17 extending through slots 14 and outwardly from the bolster walls, then downwardly at 18, then longitudinally of the truck at 19, and having upwardly extending terminals 20. The central portion 17 is seated in one set of depressions 15 and each of the outer portions 18, 19 and 20 is arranged to underlie the compression member 6 of the corresponding beam so that the latter will be caught and supported above the track in the event of the failure of its hangers 4 or the hanger bracket 3 or one of the brake heads 5.

Preferably a coil spring 21 is compressed between the outer face of each bolster side wall 12 and a corresponding pin 22 in the safety rod. Springs 21 tend to hold the safety device to its seat and prevent loose play of the device on its mounting or movement of the device into contact with the beam member 6 or the spring plank angle 10.

Figure 2:
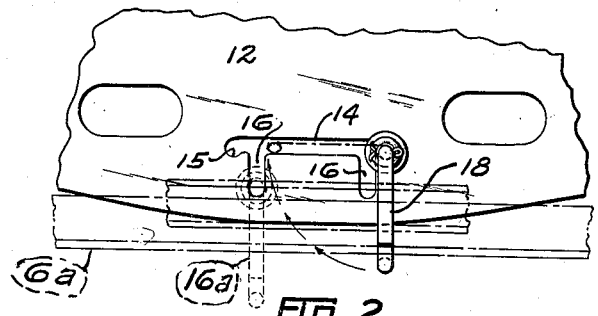
Figure 2 is a side elevation of the middle portion of the bolster section in Figure 1 showing the safety device applied thereto.

The safety device is inserted through the slots by rotating it ninety degrees from the full line position shown in Figure 2 until its depending portion 16 is horizontal and may be passed, with portions 19 and 20, through slots 14 into assembled relation with the bolster whereby springs 21 and suitable washers 23 may be slipped over the rod from its opposite ends and hold pins 22 inserted.

Vertical slots 16 are not an essential feature of the structure but are added to provide for mounting the safety device at different levels so that the beam underlying portion 19 may be positioned to accommodate beams supported at different distances above the rail. Dotted lines 16a in Figure 2 indicate the lower mounting of the safety device and dotted lines 6a indicate a corresponding lower position of the beam compression member.

Figure 3:
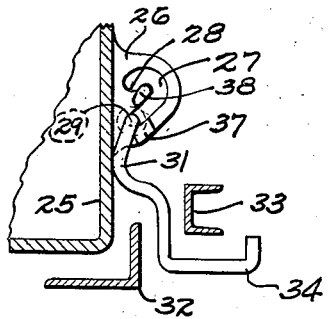
Figure 3 is a detail section corresponding to a portion of that shown in Figure 1 but illustrates another arrangement of the bolster and safety device.

Figures 3 and 4 illustrate another form of the invention in which the bolster side wall 25 is provided with a pair of outwardly projecting ears or webs 26, each having a slot 27 the ends of which form upwardly facing seats 28 and 29, respectively, adapted to mount the horizontal leg 30 of the safety device which extends downwardly from the end of leg 30 to bear against the bolster wall at 31 and then extends outwardly and downwardly between the spring plank angle 32 and the brake beam compression member 33 and then outwardly and upwardly at 34 to underlie the beam compression member, similarly to the corresponding parts in the form of the invention previously described.

A spring 35 is compressed between the right hand ear 26 and a pin 36 through arm 30 and thrusts the safety device towards the right so that its depending portion 39 engages the face of the corresponding ear 26 and is frictionally retained against swinging movement. Preferably a lug 37 may be formed on the ear to engage the depending portion of the safety device and positively prevent its movement away from the bolster wall unless the device is first shifted to the left by overcoming the thrust of spring 35. A similar lug 38 engages the depending portion of the safety device when the latter is carried by the upper seats 28.

Figures 5 and 6 illustrate another form of the invention in which ears or webs 40, 41 and 42 are formed on the bolster side wall 43 and the safety device has a horizontal arm 44 arranged to be mounted in the apertures 45 in a selected pair of ears whereby the height of the safety device may be varied and also the device may be shifted to one side or the other of the center line of the truck to accommodate the inclination of the brake lever (not shown) and the position of the bottom connection 46.

The safety device includes a depending leg 47 bearing against the bolster side wall and then extending outwardly and downwardly and then upwardly and horizontally to form a loop portion 48 surrounding the bottom connection and to underlie the brake beam compression member 49 and the brake beam strut 50. Coil springs 51 hold the safety device against swinging motion and intermediate the selected ears 41, but these springs may be compressed to permit the horizontal arm 44 to be shifted so that the arm may be removed from the selected apertures and inserted in another pair of apertures.

Figures 7 and 8 illustrate another form of the invention in which the safety device 55 extends through the bolster and is seated in selected portions of slots 56 corresponding to the slots shown in Figures 1 and 2. The device is centered by its own elasticity provided by loops 57, the lower of which bears against the outer face of the bolster side wall. Preferably lugs 58 are provided on the side wall to receive the lower loop 57 between them to prevent the safety device from swinging on its pivot. The inner lug 58 may cooperate with another lug 59 to hold the safety device against swinging movement when it is shifted to the lower position indicated in dot and dash lines at 60.

Figures 9 and 10 illustrate another form of the invention in which ears or webs 65 similar to those shown in Figures 3 and 4, but more widely spaced, are formed on the bolster side wall 66. The safety device comprises a stirrup-like member having upright portions 67 with outturned flanges 68 adapted to be received in slots 69 in ears 65. The lower portion of the stirrup member is shaped to underlie the brake beam strut 70 and compression member 71 and the bottom connection rod 72. The stirrup member is held in position by its own resiliency. When inserted into the slots, it is deformed from its normal position indicated at 73 to an ear clearing position indicated at 74 and, with flanges 68 aligned with slot 69, permitted to expand to the full line position shown in which portions 67 are held in contact with the bolster wall 66 by ear lugs 68a, and the elasticity of the device tends to hold against movement away from ears 65.

Figure 11:
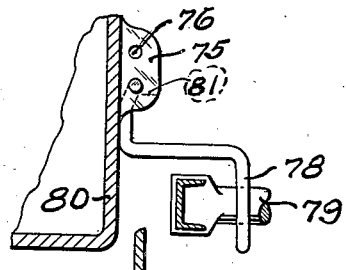
Figure 12:
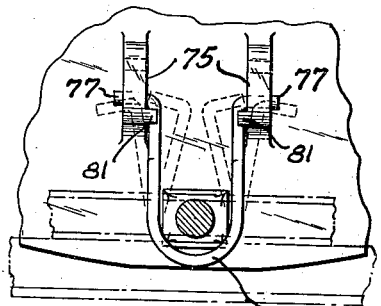

Figures 11 and 12 illustrate a similar arrangement in which each of the bolster ears or webs 75 has disassociated apertures 76 for receiving a selected one of the flanges 77 on the stirrup-like safety device, and the latter is provided with a centrally disposed U-shaped portion 78 arranged to underlie the beam strut 79 only. As with the arrangement shown in Figures 9 and 10, the elasticity of the device and its engagement with the bolster side wall 80 and ear lugs 81 holds the device against loose play.

Figure 13:
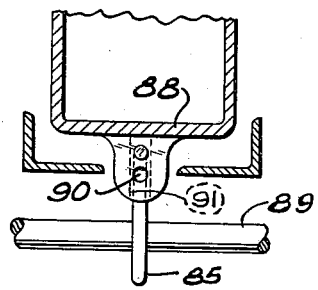
Figure 14:
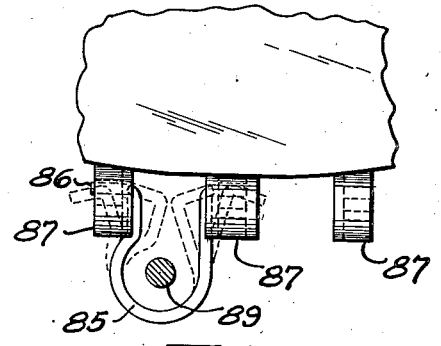

Figures 13 and 14 illustrate another form of the invention in which a stirrup-like safety device 85 has its upper ends flanged at 86 to be received in a selected pair of ears or webs 87 depending from the lower wall 88 of the bolster. The safety device is arranged to be assembled with the bottom connection rod 89 only. As long as this rod is supported and is unbroken the brake beam cannot fall to the track. Ears 87 have vertically spaced apertures 90 for mounting the safety device at different levels. Lugs 91 hold the device against swinging.

Figure 15:
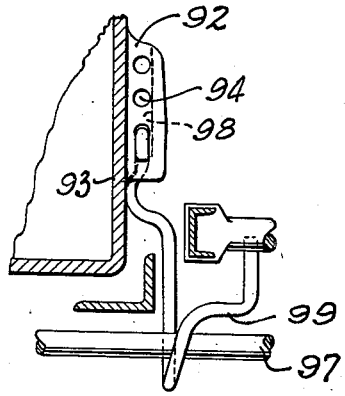
Figure 16:
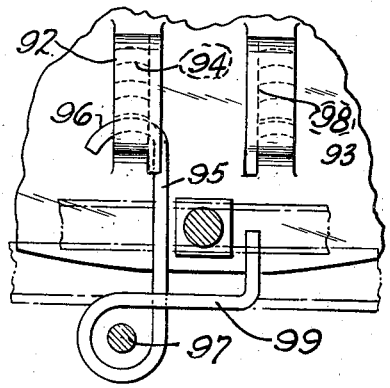

Figures 15 and 16 illustrate another form of the invention in which ears or webs 92 on the bolster side wall 93 have apertures 94 which are arched across the ear. The safety device 95 has a flange 96 at its upper end similarly arched and only insertable into a selected aperture 94 by being swung approximately ninety degrees from its functioning position. Obviously when the device is assembled with the bottom connection 97 it cannot be dislodged from its mounting ear by any ordinary shifting or swinging movement. Preferably each ear 92 is provided with a ledge 98 paralleling the adjacent bolster wall and forming a retainer preventing the safety device from swinging away from the bolster. The device includes a horizontally extending portion 99 underlying the brake beam compression member and strut similarly to the arrangements shown in Figures 5 and 6.

All forms of the invention embody a simple, effective, economical device which is readily applied to a supporting bracket. In the drawings this bracket is shown on the bolster side wall but it will be understood that a corresponding bracket could be provided on the adjacent truck frame if it were preferred to use the truck frame as a support rather than the bolster, as might well be the case if the bolster was of the "lateral motion" type carried on the frame by swing hangers, rollers, rockers or laterally flexible springs.

Other variations in the details of the construction may be made by those skilled in the art without departing from the spirit of the invention, and the exclusive use of such modifications as come within the scope of the claims is contemplated.

What is claimed is:

1. In combination, a railway truck member provided with vertically spaced seat structures, and a brake gear support device including elements carried on a selected seat structure, said device including means yieldingly holding said elements assembled with said member in the selected seat structure.

2. In combination, a railway truck member provided with spaced seat structures, and a brake gear support device adapted to be carried on a selected seat structure, and a separately formed spring compressed between said member and said device for yieldingly holding said device on the selected seat structure.

3. In combination, a railway truck bolster including an upright part provided with vertically spaced seat structures, and a brake gear support device including elements carried on a selected seat structure, the device including means yieldingly holding said elements assembled with said member in the selected seat structure.

4. In combination, a railway truck bolster having upright side walls spaced apart and apertured to provide sets of seats at different levels, and a brake gear support device comprising a bar extending through said bolster from side to side and carried on a selected set of seats and depending at the opposite sides of said bolster to underlie brake gear.

5. A structure as described in claim 4 which also includes means yieldingly holding the brake gear support device against movement relative to the bolster by accommodating intensional shifting of the support device from one set of seats to another set of seats.

6. In combination, a railway truck bolster having upright webs provided with apertures forming spaced seats in each web, and a brake gear support device extending through said apertures and resting on selected seats and having oppositely facing depending portions at corresponding sides of said webs, said portions forming brake gear engaging elements, said device being movable in said apertures from one set of seats to another to accommodate said elements for brake gear parts in different positions.

7. In combination, a railway truck bolster having horizontally spaced upright webs, each with an aperture forming vertically spaced seats, a brake gear support device including a portion extending through said apertures and resting on selected seats and having structure depending from said portion and forming brake gear engaging elements, said device including means yieldingly holding said member on the selected seats, said device being movable in said apertures to other selected seats to accommodate brake gear at a different level.

8. In a railway truck, a bolster having spaced upright webs provided with apertures, and a brake gear support device including a portion extending through said apertures and seated therein and then downwardly and outwardly at opposite sides of said bolster to form brake gear engaging elements, each of said apertures being extended longitudinally of the bolster to permit the application and removal of said device by rotating its depending portions about the axis of its seated portion approximately ninety degrees from functioning position.

9. A structure as described in claim 8 in which each aperture also includes vertical extensions to provide vertically spaced seats on which the support device may be selectedly mounted.

10. A structure as described in claim 8 in which each aperture also includes vertical extensions to provide vertically spaced seats on which the support device may be selectedly mounted, and means yieldingly holding the support device to selected seats.

11. In a railway truck structure, a bolster web with spaced lugs projecting therefrom, and a brake gear support device carried on said lugs and including spring structure compressed between said lugs and said device and holding said device against movement relative to said bolster, said device being removable from said bolster by positive distortion of the spring structure and shifting of the device from said lugs.

12. In a railway truck, a bolster, a truss type brake beam extending alongside of said bolster and including a compression member, a tension member and a strut between the same, a bottom connection rod below the level of said strut, and a brake gear support member comprising upright legs at opposite sides of said strut and having elements carried by said bolster, the lower portions of said legs forming a loop to receive said strut and connection rod.

13. In a railway truck, a bolster, a truss type brake beam extending alongside of said bolster and including a compression member, a tension member and a strut between the same, a bottom connection rod below the level of said strut and offset therefrom longitudinally of the beam, and a brake gear support member comprising upright legs at opposite sides of said strut and having elements carried by said bolster, the lower portions of said legs being inclined downwardly and longitudinally of the beam to form a loop receiving said strut and connection rod.

14. In a railway truck, a bolster, a truss type brake beam extending alongside of said bolster and including a compression member, a tension member and a strut between the same, a bottom connection rod below the level of said strut, and a brake gear support device supported by said bolster and depending therefrom and having spaced portions for underlying said strut and bottom connection rod respectively.

15. In combination, a railway truck bolster having upright webs provided with apertures forming spaced seats in each web, and a brake gear support device extending through said apertures and resting on selected seats and including structure depending below said seats and terminating in a brake gear engaging portion, said device being movable in said apertures from one set of seats to another to accommodate said portion for brake gear parts in different positions.

16. In a railway brake gear safety device, a horizontally disposed upper part for seating on horizontally spaced support elements, and a downwardly and laterally extending part arranged to underlie a brake beam bottom connection rod and a truss type brake beam strut associated with said rod.

17. In combination, a railway truck part having a wall with an ear projecting therefrom, said ear having a horizontally opening aperture, a brake gear support device having an upright leg with a flange at its upper end seated in said aperture, there being spring means thrusting said leg towards said ear, said ear being recessed to receive said device leg and hold said device against swinging movement relative to said wall.

18. In combination, a railway truck part having a wall with horizontally spaced ears projecting therefrom, said ears having horizontally aligned apertures, a brake gear support device having upright legs with flanges at their upper ends seated in said apertures, said device being of spring material whereby said legs are thrust towards said ears, and lugs on said ears projecting therefrom and paralleling and spaced from said wall to engage said device legs at points spaced from said flanges and hold said device gainst movement away from said wall.

19. In combination, a railway truck member provided with vertically spaced seat structures, and a brake gear support device including elements carried on a selected seat structure, said device being movable from one seat structure to another without disassembly from said truck member, and said device including means yieldingly holding said elements assembled with said member in the selected seat structure.

G. N. VAN SWERINGEN.